United States Patent
Wuerth et al.

[11] Patent Number: 5,493,162
[45] Date of Patent: Feb. 20, 1996

[54] POLE CORE

[75] Inventors: Hans Wuerth, Ludwigsburg; Werner Pfander, Fellbach; Walter Gritschmeier, Waiblingen; Wilhelm Post, Sachsenheim; Juergen Leinhos, Goettingen; Hans-Juergen Kessler, Zaberfeld-Michelbach; Klaus Eilert, Juehnde; Dittmar Kleemann, Friedland; Uwe Kroeger, Goettingen; Juergen Seeliger, Goettingen; Juergen Soellick, Goettingen, all of Germany; Gerda Würth nee Eurich, heiress of said Hans Wuerth, deceased

[73] Assignee: Robert Bosch GmbH, Stuttgart, Germany

[21] Appl. No.: 30,353

[22] PCT Filed: Nov. 13, 1991

[86] PCT No.: PCT/DE91/00877

§ 371 Date: Mar. 18, 1993

§ 102(e) Date: Mar. 18, 1993

[87] PCT Pub. No.: WO92/10021

PCT Pub. Date: Jun. 11, 1992

[30] Foreign Application Priority Data

Nov. 29, 1990 [DE] Germany ............... 40 38 029.7

[51] Int. Cl.⁶ ........................................... H02K 1/18
[52] U.S. Cl. ................. 310/218; 310/42; 310/179; 310/254; 29/596
[58] Field of Search ................. 310/218, 51, 42, 310/91, 254, 258, 180, 174, 179, 185, 187, 214, 208; 29/596

[56] References Cited

U.S. PATENT DOCUMENTS

| | | | |
|---|---|---|---|
| 893,711 | 7/1908 | Cushman | 310/218 M X |
| 1,527,162 | 2/1925 | Alvord | 310/218 M X |
| 1,929,787 | 10/1933 | Mudge | 310/194 |
| 2,764,802 | 10/1956 | Feiertag | 310/258 M X |
| 3,129,348 | 4/1964 | Simmons | 310/194 |
| 3,549,926 | 12/1970 | Pentland | 310/194 |
| 4,908,535 | 9/1990 | Kreuzer | 310/208 |

FOREIGN PATENT DOCUMENTS

| | | | |
|---|---|---|---|
| 293533 | 11/1971 | Austria . | |
| 0063061 | 1/1945 | Denmark | 310/218 |
| 392926 | 9/1908 | France . | |
| 237390 | 7/1978 | France . | |
| 0600235 | 7/1934 | Germany | 310/218 |
| 714806 | 8/1941 | Germany . | |
| 1586509 | 3/1981 | United Kingdom . | |
| 8906874 | 7/1989 | WIPO . | |

*Primary Examiner*—R. Skudy
*Attorney, Agent, or Firm*—Michael J. Striker

[57] ABSTRACT

A pole core with pole lips serves for fixing a field winding in the pole housing of a direct current motor. The pole core has a central pole body mountable on an inner side of the pole housing. The pole lips are formed of one piece with the central pole body and are resiliently and springily connected to the central pole body, so that the field coil can be pressed against the pole housing in an elastic springy manner without additional spring elements, so that no damage occurs to the insulating coat of the coil.

9 Claims, 2 Drawing Sheets

5,493,162

POLE CORE

BACKGROUND OF THE INVENTION

The present invention relates generally to a pole core. More particularly, it relates to a pole core which has pole lips for fixing a field winding in a pole housing of a direct current motor.

In a known pole core (WO 89/06874), pole lips extend from its central body along the longitudinal sides of the pole core. The field winding of the direct current motor is clamped between the housing inner wall, to which the pole core is screwed, and the pole lips. In order to avoid damage to the field winding insulation, a special elastic insulating material is introduced between the pole core and the winding. Installation tolerances are compensated by the plasticity of the insulating material and, where applicable, by the coil body insulating compound which also provides pre-fixing of the assembled unit, and hence prevents separation of the components.

SUMMARY OF THE INVENTION

Accordingly, it is an object of the present invention to provide a pole core which avoids the disadvantages of the prior art.

In keeping with these objects and with others which will become apparent hereinafter, one feature of the present invention resides, briefly stated, in a pole core in which the pole lips are resiliently and springily connected to a central body of the pole core and press the field winding against the pole housing.

When the pole core is designed in accordance with the present invention, it has the advantage that it allows high strength insulating coats, which have a much lower plasticity than conventional PVC coats, to be applied to the field coils.

Due to the resilient connection of the pole lips with the central body of the pole core, fitting tolerances can be compensated without the need for a special insulating body. At the same time, pre-fixing is ensured during fitting of the pole core and during the clamping of the field winding, whereby any loosening of the assembled unit is prevented, even when subjected to dynamic loads due to vibrations.

A particularly preferred design of the pole core is one in which the pole lips have a recess or a groove at the transition to the central body of the pole core. Stresses on the coil in the edge region are prevented due to the pole lip, in particular when the recess or groove is arranged on the inside, i.e. the pole lip side which faces the field winding, so that damage to the insulating layer is minimized.

The simple manufacture of the pole core is provided when grooves in the transition between the central body and the pole lips are produced simply by material displacement or material removal.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
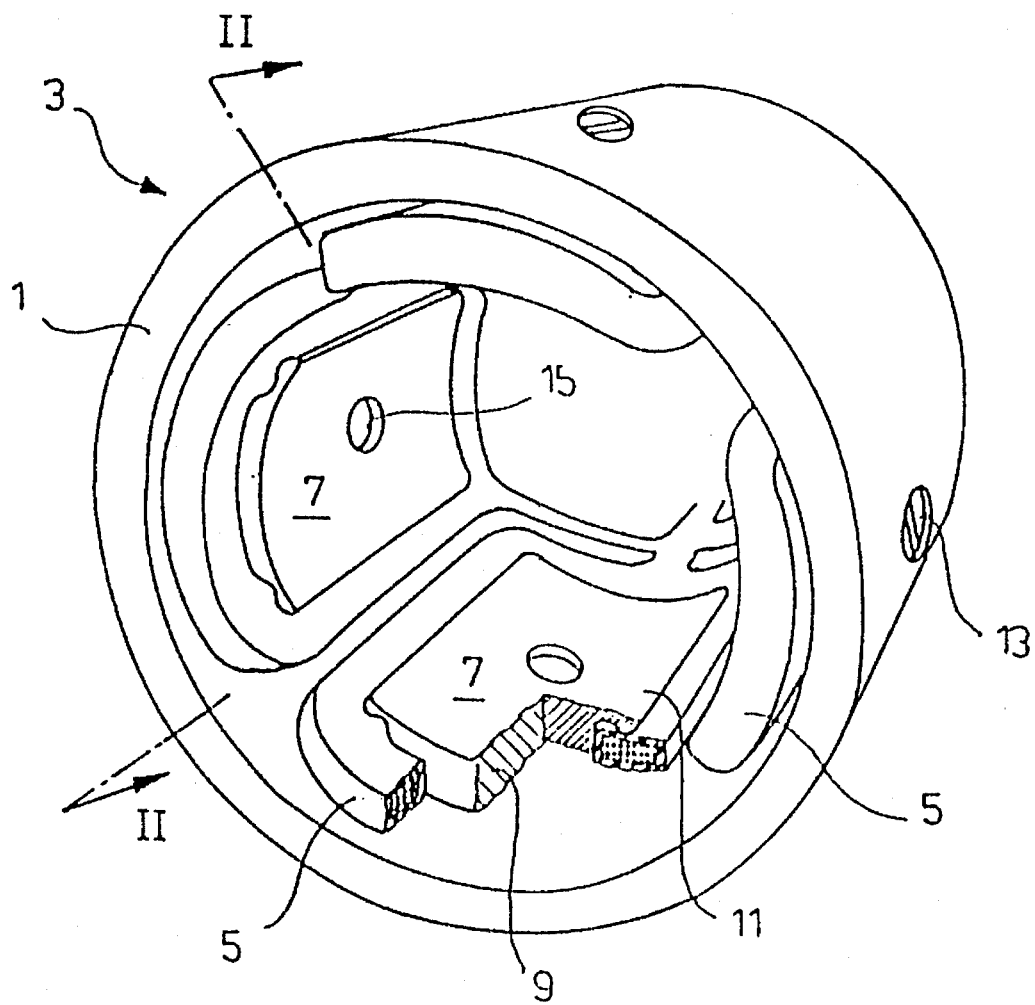
FIG. 1 shows a perspective view of an electric motor with several field coils held by pole cores. One pole assembly is shown in part section.

The perspective representation in accordance with FIG. 1 shows the housing 1 of a direct current motor 3. The housing wall has four field coils 5 clamped to it by means of associated pole cores 7.

One of the field windings is partly cut away to show that the pole lips 11 extend from the central body 9 of the pole core 7 in the region of the longitudinal edges of the core, extending over the entire length of the central body 9. The pole lips project over the field windings so that when the pole core is tightened, they are pressed against the inner wall of the housing 1.

The pole cores are held by the fixing screws 13 which are passed through the wall of the housing 1 from the outside and screwed into a tapped hole 15 in the central body 9 of the pole cores.

Figure 2:
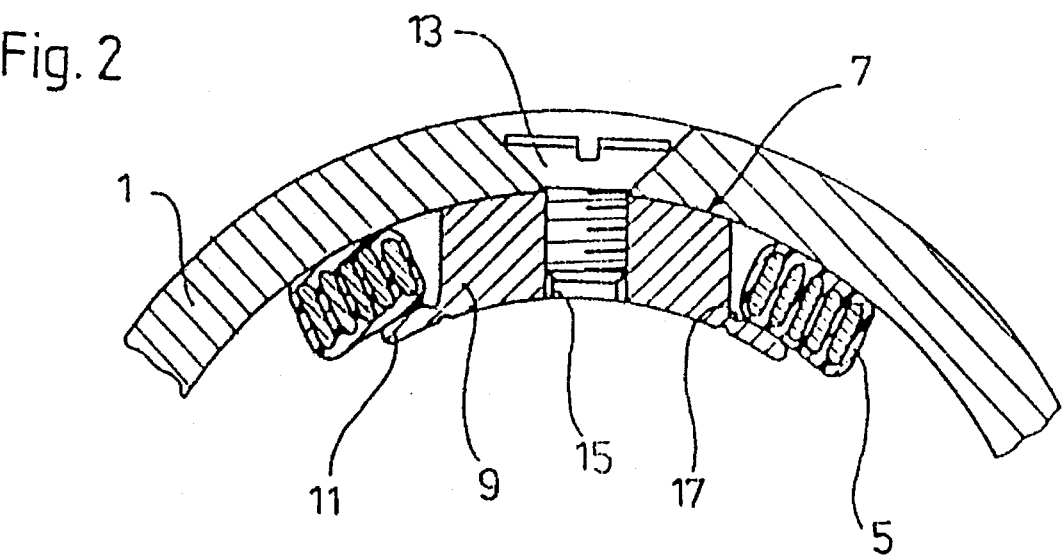
FIG. 2 shows a part cross-section of an electric motor in accordance with FIG. 1 with a second design of a pole core in assembled position.

The clamping of the field coils is again clearly shown in the FIG. 2 through section II—II in FIG. 1. Identical parts are identified by the same reference characters.

The pole core 7 is secured by means of the fixing screw 13 which is passed from the outside through the wall of the housing 1. The field coils 5 are clamped between the pole lips 11, which extend from the central body 9, and the wall of the housing 1. The section in accordance with FIG. 2 shows clearly that recesses or grooves 17 are provided in the transition between the central body 9 and the pole lips 11 on the side facing the field winding 5 which extend over the entire length of the pole lips.

Figure 3:
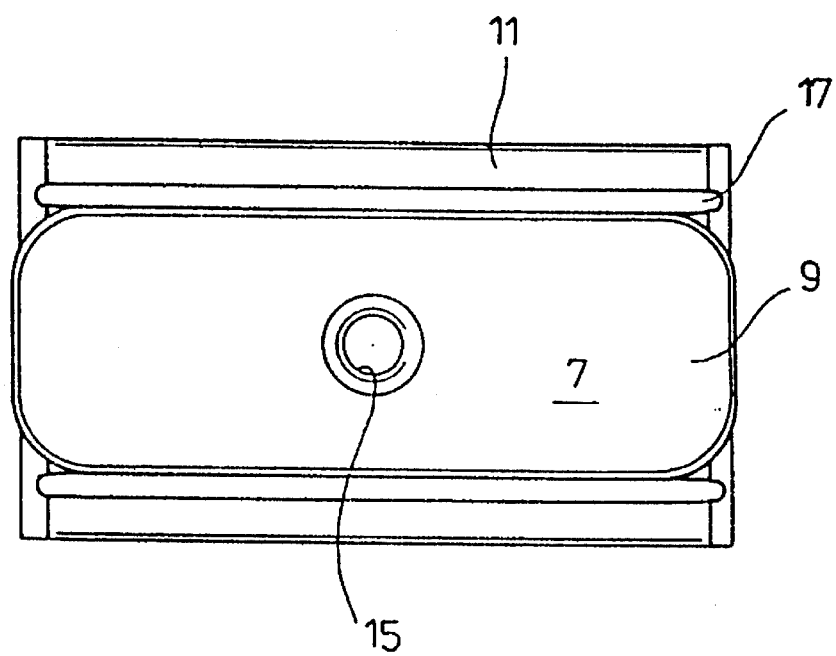
FIG. 3 shows a view of the pole core from the underside.

FIG. 3 shows a dismantled pole core 7 viewed from the underside. The centrally arranged hole 15 is clearly recognizable.

This is provided with an internal thread in which the clamping screw 13 is located. The pole lips 11 which extend from the central body 9 of the pole core 7 are also clearly recognizable. They have a longitudinal groove 17 in the transitional region between the central body and the pole lips.

Figure 4:
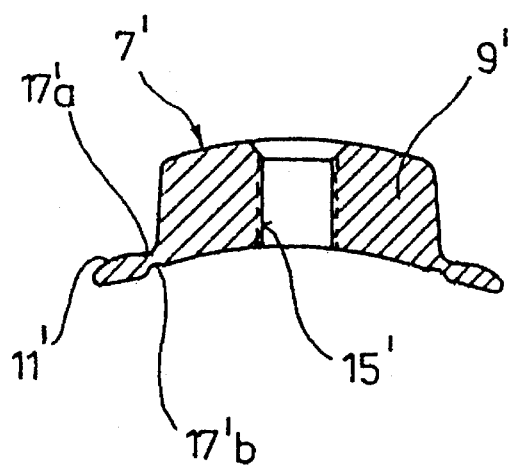
FIG. 4 shows a section through the second design example of the pole core; unassembled.

FIG. 4 shows a further design example of a pole core 7' which is characterized by the fact that two grooves 17'a and 17'b are provided in the transition between the central body 9' and the pole lip 11'. The groove 17'a extends on the inner face of the pole lip which faces the inner wall of the housing 1, as seen in the assembled position, while the groove 17'b is arranged on the opposite outer side of the pole lip.

The pole core 7' is provided with a hole 15' which has an internal screw thread to locate the clamping screw 13 (see FIGS. 1 and 2). To facilitate the insertion of the fixing screw, the internal screw thread in the pole core can be provided with a pilot hole on the side facing the inner wall of the housing.

Figure 5:
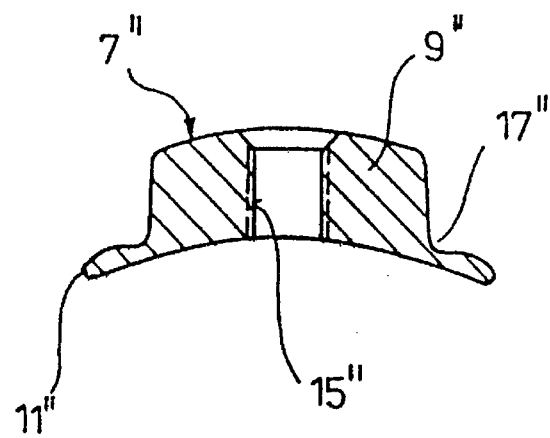
FIG. 5 shows a section through the first design example of a pole core.

FIG. 5 shows a section through a further embodiment example of a pole core 7", in which the transitional region between the central body 9" and the pole lip 11" does not have a distinctive groove, but merely a notch 17".

The pole core shown in FIG. 5 is also provided with a hole 15" which has in internal screw thread. To facilitate the insertion of the fixing screw. This embodiment design can also be provided with a pilot hole on the side facing the inner wall of the housing.

It should be mentioned that the longitudinal grooves 17 (FIGS. 2 and 3), 17'a, 17'b (FIG. 4) and 17" (FIG. 5) can be arranged in any suitable manner in the transitional region between the central body and the pole lips of the pole core. It is possible, for example, to apply a deforming procedure in order to roll longitudinal grooves in the manner of flutes or to engrave these into the region where the pole lips originate. It is further feasible to arrange grooves in the transitional region between the pole lips and the central body of the pole core by means of a grinding or milling process. It is further possible during the manufacture of the pole core 7" or during a casting process, to provide notches 17" such as shown in FIG. 5, which result in some material weakening.

The pole core design which is described here makes it possible to clamp field windings of electric motors to the wall of the motor housing, free from any damage, even when the insulating material selected for the field coils is a very brittle heat resisting coating. In such coils, manufacturing tolerances can no longer be compensated by the plasticity of the insulating material; but the resiliently springy pole lips make it possible for coils to be securely mounted, even for coils provided with brittle insulating material. Depending on the pole core material, the recesses in the transitional region between the central body and the pole lips can be selected so that the remaining residual material facilitates a predetermined spring or clamping force. In such an arrangement, a limit of the forces acting on the field coil can be specified, thereby virtually eliminating any cracks due to excessive clamping forces.

The representation in FIG. 2 clearly shows that, particularly in the arrangement of the groove 17 on the side of the pole lip 11 which faces the field winding 5, any loading of the edge region of the coil by clamping forces is avoided. This region in particular could otherwise be subject to very high clamping forces leading to damage or chipping of the insulating material.

The wall thickness which exists in the region of the transition between the central body and the pole lips, i.e. in the region of the grooves, can be arranged in relation to the pole core material, so that a reversible preloading results. This means that, if required, the pole core can be re-used after dismantling. Alternatively, it is possible to bend pole lips by stamping prior to assembly. On tightening of the pole cores, the pole lips are restored to the required assembly position. Overall, it can be seen that the resilient, springy pole lips, make it possible to use coils with a thermally stable, harder, insulating coat. Moreover, larger dimensional deviations in the fitting of such coils can still be tolerated.

The method of rolling grooves into the pole lips or stamping flutes into these can be used in the case of both conventional poles with lateral pole shoes and poles with frontal pole lips.

It will be understood that each of the elements described above, or two or more together, may also find a useful application in other types of constructions differing from the types described above.

While the invention has been illustrated and described as embodied in a pole core, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A pole core for a direct current motor having a pole housing and a field winding, said pole core comprising a central pole body mountable on an inner side of the pole housing; and pole lips which are formed of one piece with said central pole body and extend from opposite sides of said central pole body so as to press the field winding against the pole housing, said pole lips being resiliently and springily connected with said central pole body so that the field winding can be pressed against the pole housing in an elastic springy manner by said pole lips which are resiliently and springily connected with said central pole body, without additional spring elements.

2. A pole core as defined in claim 1, and further comprising a transitional region between said central pole body and said pole lips, said transitional region having two sides and being provided with a groove on one of said sides.

3. A pole core as defined in claim 2, wherein said transitional region is provided with another groove on another of said sides.

4. A pole core as defined in claim 1, wherein said central pole body has two longitudinal sides, said pole lips extending along both said longitudinal sides of said central pole body.

5. A method of producing a direct current motor having a pole housing and a field winding, the method comprising the steps of making a pole core having a central pole body and pole lips formed of one piece with said central pole body and extending from opposite sides of said central pole body so that said pole lips are connected resiliently and springily with said central pole body; and arranging said pole core so that the pole lips which are resiliently and springily connected with said central pole body, press the field winding against the pole housing in an elastic springy manner without additional spring elements.

6. A method as defined in claim 5, and further comprising providing a groove in a transitional region between the central pole body and the pole lips so as to provide the resilient connection of the pole lips with the central pole body.

7. A method as defined in claim 6, wherein said providing includes manufacturing the groove by a material displacement.

8. A method as defined in claim 6, wherein said providing includes manufacturing the groove by a material removal.

9. A direct current motor, comprising a pole housing; a field winding arranged in said pole housing; and a pole core having a pole housing and a field winding, said pole core comprising a central pole body mountable on an inner side of the pole housing and pole lips which are formed of one piece with said central pole body and extend from opposite sides of said central pole body so as to press the field winding against the pole housing, said pole lips being resiliently and springily connected with said central pole body so that the field winding is pressed by said pole lips which are resiliently and springily connected with said central pole body, against the pole housing in an elastic springy manner without additional spring elements.

* * * * *